United States Patent
Kirzhner

(10) Patent No.: US 8,051,654 B2
(45) Date of Patent: Nov. 8, 2011

(54) REHEAT GAS AND EXHAUST GAS REGENERATOR SYSTEM FOR A COMBINED CYCLE POWER PLANT

(75) Inventor: Joseph Kirzhner, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 952 days.

(21) Appl. No.: 12/023,698

(22) Filed: Jan. 31, 2008

(65) Prior Publication Data

US 2009/0193812 A1  Aug. 6, 2009

(51) Int. Cl.
*F02C 6/00* (2006.01)
*F02C 7/10* (2006.01)

(52) U.S. Cl. .................. 60/511; 60/39.15; 60/39.182

(58) Field of Classification Search ............ 60/39.15, 60/39.511, 39.182, 39.5, 29.21, 39.21
See application file for complete search history.

(56) References Cited

U.S. PATENT DOCUMENTS

| | | | |
|---|---|---|---|
| 2,303,381 A | 12/1942 | New | |
| 2,758,979 A * | 8/1956 | Guthrie | 502/39 |
| 3,054,257 A | 9/1962 | Schelp | |
| 3,315,467 A | 4/1967 | De Witt | |
| 3,765,170 A * | 10/1973 | Nakamura | 60/39.17 |
| 3,796,045 A * | 3/1974 | Foster-Pegg | 60/772 |
| 3,949,548 A | 4/1976 | Lockwood, Jr. | |
| 4,064,690 A | 12/1977 | Kronogard | |
| 4,267,692 A * | 5/1981 | Earnest | 60/39.181 |
| 4,272,952 A | 6/1981 | Graham | |
| 4,421,989 A | 12/1983 | Brannstrom | |
| 4,468,923 A * | 9/1984 | Jorzyk et al. | 60/781 |
| 4,537,023 A * | 8/1985 | Nakamura et al. | 60/775 |
| 4,896,499 A | 1/1990 | Rice | |
| 5,105,617 A | 4/1992 | Malohn | |
| 5,212,942 A | 5/1993 | Malohn | |
| 5,323,603 A * | 6/1994 | Malohn | 60/784 |
| 5,647,199 A | 7/1997 | Smith | |
| 5,778,657 A * | 7/1998 | Ohtomo et al. | 60/39.182 |
| 5,881,549 A | 3/1999 | Janes | |
| 5,934,065 A * | 8/1999 | Bronicki et al. | 60/39.181 |
| 6,351,935 B1 * | 3/2002 | Bronicki et al. | 60/39.182 |
| 6,370,865 B1 * | 4/2002 | Sasaki et al. | 60/39.5 |
| 6,560,957 B2 * | 5/2003 | Hatamiya et al. | 60/39.511 |
| 6,817,187 B2 | 11/2004 | Yu | |

FOREIGN PATENT DOCUMENTS

| | | | |
|---|---|---|---|
| EP | 0061262 | * | 9/1982 |
| WO | 0214664 A1 | | 2/2002 |
| WO | 2007043924 A1 | | 4/2007 |

* cited by examiner

*Primary Examiner* — William Rodriguez
*Assistant Examiner* — Gerald Sung
(74) *Attorney, Agent, or Firm* — Cantor Colburn LLP

(57) ABSTRACT

A combined cycle power plant includes a compressor, a first turbine, a second turbine, a first combustor, a second combustor, a heat exchanger and a heat recovery steam generator. A controller operates the combined cycle power plant a first mode wherein compressor air is passed through the heat exchanger before being delivered to the first and second combustors, and exhaust gas from the second turbine is passed to the heat exchanger. The exhaust gas from the second turbine pre-heats the compressor air passing through the heat exchanger to the first and second combustors.

18 Claims, 4 Drawing Sheets

US 8,051,654 B2

REHEAT GAS AND EXHAUST GAS REGENERATOR SYSTEM FOR A COMBINED CYCLE POWER PLANT

BACKGROUND OF THE INVENTION

The present invention pertains to the art of combined cycle power plants and, more particularly, to a combined cycle power plant having a reheat gas turbine and an exhaust gas regenerator.

In general, gas turbine engines combust a fuel/air mixture to release heat energy to form a high temperature gas stream that is channeled to a turbine section via a hot gas path. More specifically, a compressor compresses incoming air to a high pressure. The high pressure air is delivered to a combustion chamber to mix with fuel and form a combustible mixture. The combustible mixture is then ignited to form a high pressure, high velocity gas stream that is delivered to a turbine. The turbine converts thermal energy from the high temperature, high velocity gas stream to mechanical energy that rotates a turbine shaft. The turbine shaft is coupled to, and drives, the compressor as well as also other machinery coupled to the turbine such as, an electrical generator.

After converting the thermal energy from the high pressure, high velocity gas stream to mechanical energy, exhaust gases are formed and vented from the turbine. The exhaust gases can either be expelled to ambient air, or used to preheat the combustion chamber and increase turbine efficiency. Optimizing turbine efficiency at various operating conditions, particularly at part load where emissions are typically at high levels is a concern.

BRIEF DESCRIPTION OF THE INVENTION

In accordance with an exemplary embodiment of the present invention, a combined cycle power plant includes a compressor, a first turbine operatively coupled to the compressor, a second turbine operatively coupled to the compressor, a first combustor fluidly connected to the first turbine, and a second combustor fluidly connected to the second turbine. The combined cycle power plant also includes a heat recovery steam generator fluidly connected to the second turbine, and a heat exchanger fluidly connected to the compressor, the first combustor, the second combustor and the heat recovery generator. A controller selectively operates the combined cycle power plant a first mode wherein compressor air is passed through the heat exchanger before being delivered to the first and second combustors, and exhaust gas from the second turbine is passed to the heat exchanger. The exhaust gas from the second turbine pre-heats the compressor air passing through the heat exchanger to the first and second combustors.

In accordance with another exemplary embodiment of the present invention, a method of operating a combined cycle power plant having a compressor, a first turbine, a second turbine, a first combustor fluidly connected to the first turbine, a second combustor fluidly connected to the second turbine, and a heat recovery steam generator includes operating the combined cycle power plant in a first mode wherein compressor air and exhaust gas from the second turbine are passed through at least one heat exchanger. The exhaust gases pre-heat the compressor air passing from the at least one heat exchanger to each of the first and second combustors.

Additional objects, features and advantages of exemplary embodiments of the present invention will become more readily apparent from the following detailed description of illustrated aspects when taken in conjunction with the drawings wherein like reference numerals refer to corresponding parts in the several views.

DETAILED DESCRIPTION OF THE INVENTION

Figure 1:
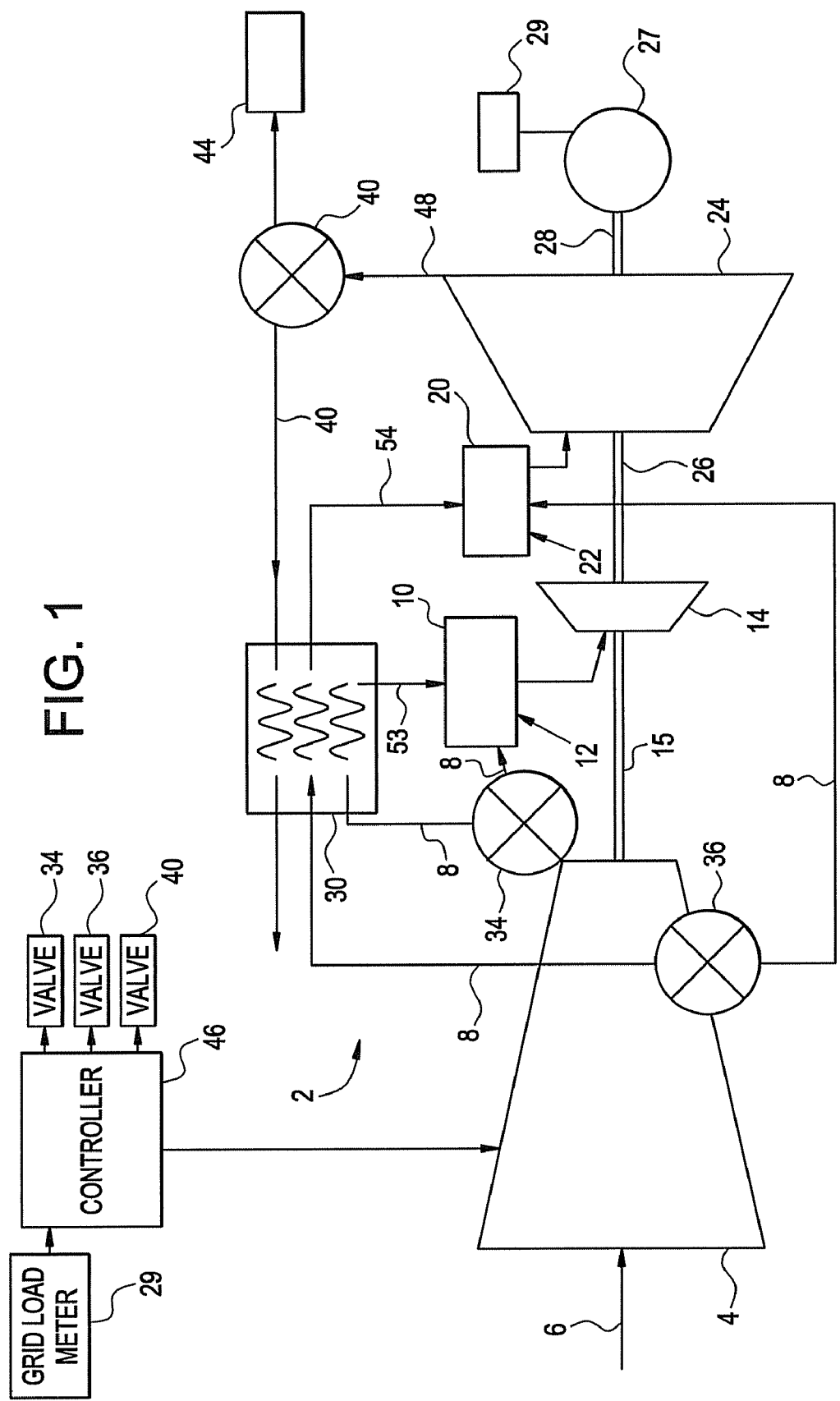
FIG. 1 is a schematic representation of a combined cycle power plant including a re-heat and exhaust gas regeneration system constructed in accordance with a first exemplary embodiment of the present invention.

With initial reference to FIG. 1, a combined cycle power plant constructed in accordance with an exemplary embodiment of the present invention is indicated generally at 2. Power plant 2 includes a compressor 4 that compresses ambient or atmospheric air 6 to form a high pressure air stream 8. High pressure air stream 8 is passed to a first or main combustor 10 to mix with fuel 12 before being ignited to form high pressure, high temperature combustion products that are delivered to a first or high pressure turbine 14. First turbine 14 drives compressor 4. Towards that end, first turbine 14 is coupled to compressor 4 by a shaft 15. In addition to supplying main combustor 10, compressor 4 delivers high pressure air stream 8 to a second or reheat combustor 20. High pressure air stream 8 mixes with fuel 22 before being ignited to form high pressure, high temperature combustion products that are delivered to a second or low pressure turbine 24. In any event, second turbine 24 is coupled to first turbine 14 by a shaft 26 and to a generator 27 by a shaft 28. Electrical demand from a generator 27 is monitored by a grid load meter 29. As will be discussed more fully below, power plant 2 operates in a first mode in which high pressure air stream 8 is delivered directly to main combustor 12 and reheat combustor 20 and in a second or part load mode when demand for electricity falls below base load levels, in which high pressure air stream 8 is first passed through a heat exchanger 30 to be heated prior to passing into main combustor 12 and reheat combustor 20. Typically, operation in the second mode occurs when output from power plant 2 drops below 80% of base load operation.

In accordance with the exemplary embodiment shown in FIG. 1, power plant 2 includes a first valve 34 fluidly connected between compressor 4, main combustor 12 and heat exchanger 30. Power plant 2 also includes a second valve 36 that is fluidly connected between compressor 4, reheat combustor 20 and heat exchanger 30. Power plant 2 further includes a third valve 40 that is fluidly connected between low pressure turbine 24, heat exchanger 30 and a heat recovery steam generator (HRSG) 44. In the exemplary embodiment shown, each valve 34, 36 and 40 is operatively connected to a controller 46. With this arrangement, when part load operation is necessary e.g., when demand for electricity drops, and base load operation is no longer required such as during off peak hours, controller 46 operates first and second valves to deliver high pressure air stream 8 to heat exchanger 30. At the same time, controller 46 operates third valve 40 to cause exhaust gases 48 exiting from low pressure turbine 24 to be diverted from HRSG 48 to heat exchanger 30. In this manner, exhaust gases 48 pre-heat high pressure air stream 8 passing through heat exchanger 30 to form first and second heated high pressure air streams 53 and 54 that are delivered to main combustor 12 and reheat combustor 20 respectively. By heating high pressure air stream 8 in this manner, more efficient combustion is achieved within combustors 12 and 20 resulting in lower emissions during part load operation. In accordance with one aspect of the exemplary embodiment shown, upon sensing a drop in demand in, for example, electricity as detected by grid load meter 29, controller 46 automatically switches power plant 2 from base load operation, e.g., operating in the first mode, to part load operation, e.g., operating in the second mode.

At this point it should be understood that controller 46 comprises any appropriate high-powered solid-state switching device. As illustrated, controller 46 is represented as a computer. However, this is merely exemplary of an appropriate high-powered control, which is within the scope of the invention. For example but not limiting of the invention, controller 46 comprises at least one of a silicon controlled rectifier (SCR), a thyristor, MOS-controlled thyristor (MCT) and an insulated gate bipolar transistor. In the illustrated embodiment, the control is implemented as a single special purpose integrated circuit, such as ASIC, having a main or central processor section for overall, system-level control, and separate sections dedicated performing various different specific combinations, functions and other processes under control of the central processor section. It will be appreciated by those skilled in the art that controller 46 can also be implemented using a variety of separate dedicated or programmable integrated or other electronic circuits or devices, such as hardwired electronic or logic circuits including discrete element circuits or programmable logic devices, such as PLDs, PALs, PLAs or the like. Controller 46 can also be implemented using a suitably programmed general-purpose computer, such as a microprocessor or microcontrol, or other processor device, such as a CPU or MPU, either alone or in conjunction with one or more peripheral data and signal processing devices.

Figure 2:
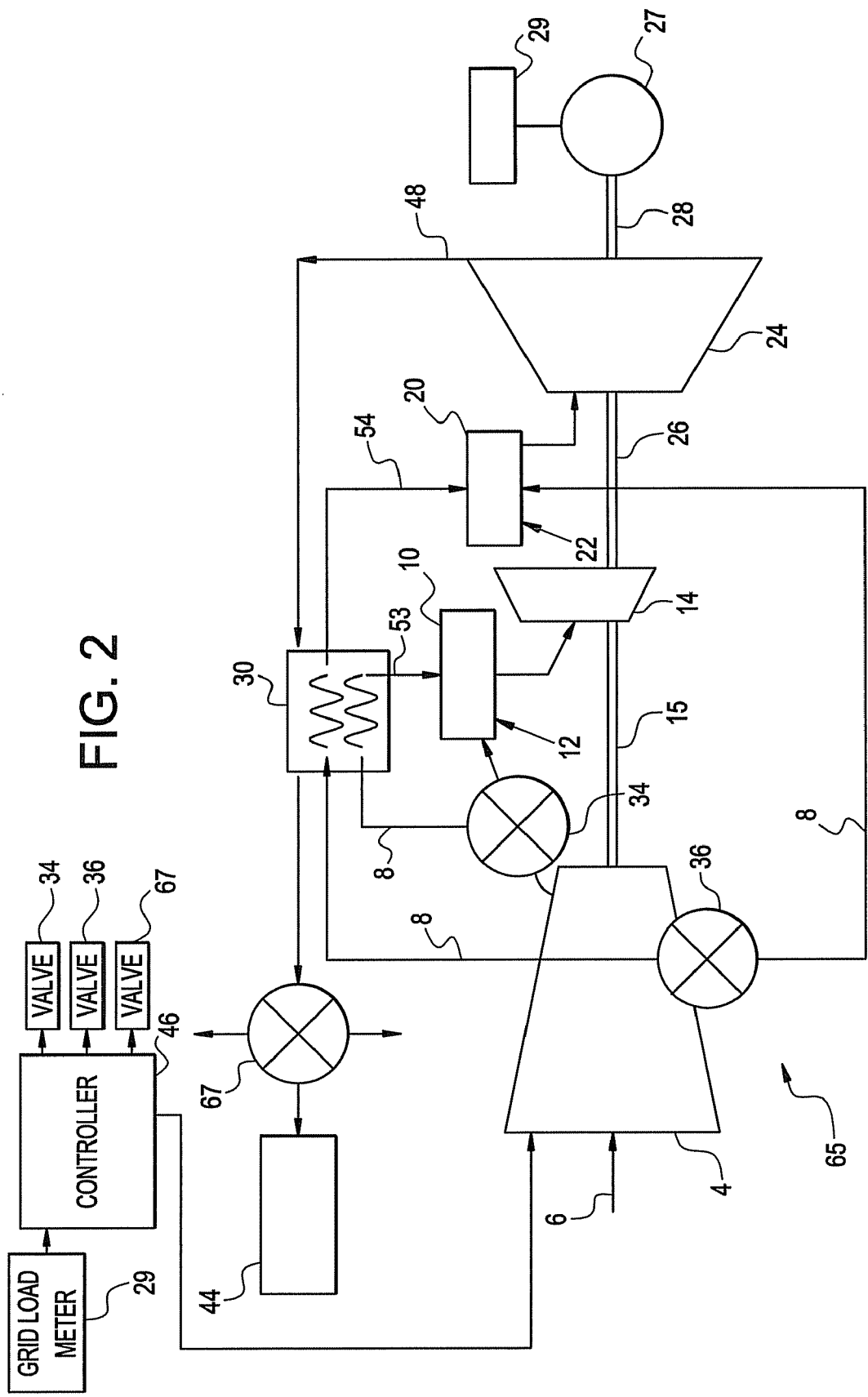
FIG. 2 is a schematic representation of a combined cycle power plant including a re-heat and exhaust gas regeneration system constructed in accordance with a second exemplary embodiment of the present invention.

Reference will now be made to FIG. 2, wherein like reference numbers represent corresponding parts in the several views, in describing a combined cycle power plant 65 constructed in accordance with a second exemplary embodiment of the present invention. As shown in FIG. 2, third valve 40 is removed and replaced by a third valve 67 located down stream from heat exchanger 30. Third valve 67 is fluidly connected between heat exchanger 30, HRSG 44, ambient air, and combustors 12 and 20. With this arrangement, when operating in the first mode, a portion of exhaust gases 48 is delivered to main combustor 12 and reheat combustor 20 in order to support combustion. By warming air directly in combustors 12 and 20, nitrogen oxides are reduced by dilution thereby further reducing emissions from power plant 2. When operating in the second mode, high pressure air streams 8 are passed through heat exchanger 30 to be heated by exhaust gases 48 prior to entering combustors 12 and 20 in a manner similar to that described above.

Figure 3:
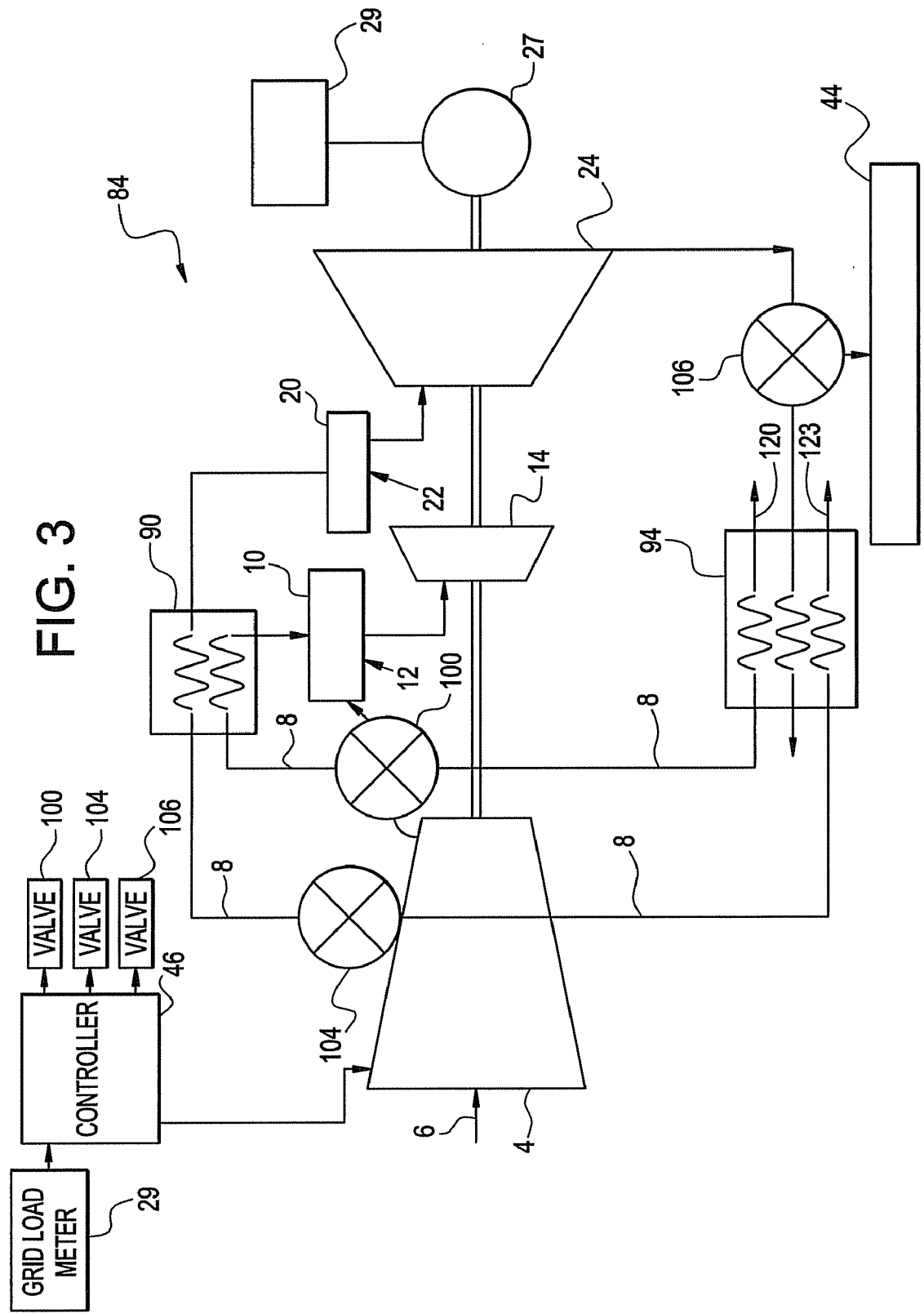
FIG. 3 is a schematic representation of a combined cycle power plant including a re-heat and exhaust gas regeneration system constructed in accordance with a third exemplary embodiment of the present invention.

Reference will now be made to FIG. 3, wherein like reference numbers represent corresponding parts in the several views in describing a combined cycle power plant 84 constructed in accordance with a third exemplary embodiment of the present invention. In a manner similar to that described above, power plant 84 is configured to operate in a first or base load mode and a second or part load mode. However, in contrast to the above described arrangements, power plant 84 includes multiple heat exchangers. More specifically, power plant 84 includes a first heat exchanger or combustion air cooler 90 which receives high pressure air steams 8 when operating in the first mode, and a second heat exchanger or exhaust gas regenerator 94 that receives high pressure air streams 8 when operating in the second mode. Towards that end, power plant 84 includes a first valve 100 fluidly connected between compressor 4, main combustor 10, first heat exchanger 90 and second heat exchanger 94. Similarly, a second valve 104 is fluidly connected between compressor 4, reheat combustor 20, first heat exchanger 90 and second heat exchanger 94. A third valve 106 fluidly connects second turbine 24, HRSG 44 and second heat exchanger 94.

When operating in the first mode, high pressure air streams 8 pass through first and second valves 100 and 104 into first heat exchanger 90. High pressure air streams 8 are cooled inside heat exchange 90 and passed onto main combustor 12 and reheat combustor 20. At the same time, exhaust gases 48 pass through third valve 106 directly to HRSG 44. When operating in the second or part load mode, high pressure air streams 8 pass through first and second valves 100 and 104 to second heat exchanger 94. Likewise, exhaust gases 48 from second turbine 24 pass through third valve 106 into second heat exchanger 94. Exhaust gases 48 heat high pressure air streams 8 within second heat exchanger 94 to form heated high pressure air streams 120 and 123 that pass to main combustor 10 and reheat combustor 20 respectively. By cooling compressor air prior to entry into combustors 10 and 20 when operating in the first mode, and heating the compressor air prior to introduction to combustors 10 and 20 in the second mode, power plant 84 operates more efficiently at base load conditions while, also maintaining emissions below mandated levels when operating at part load.

Figure 4:
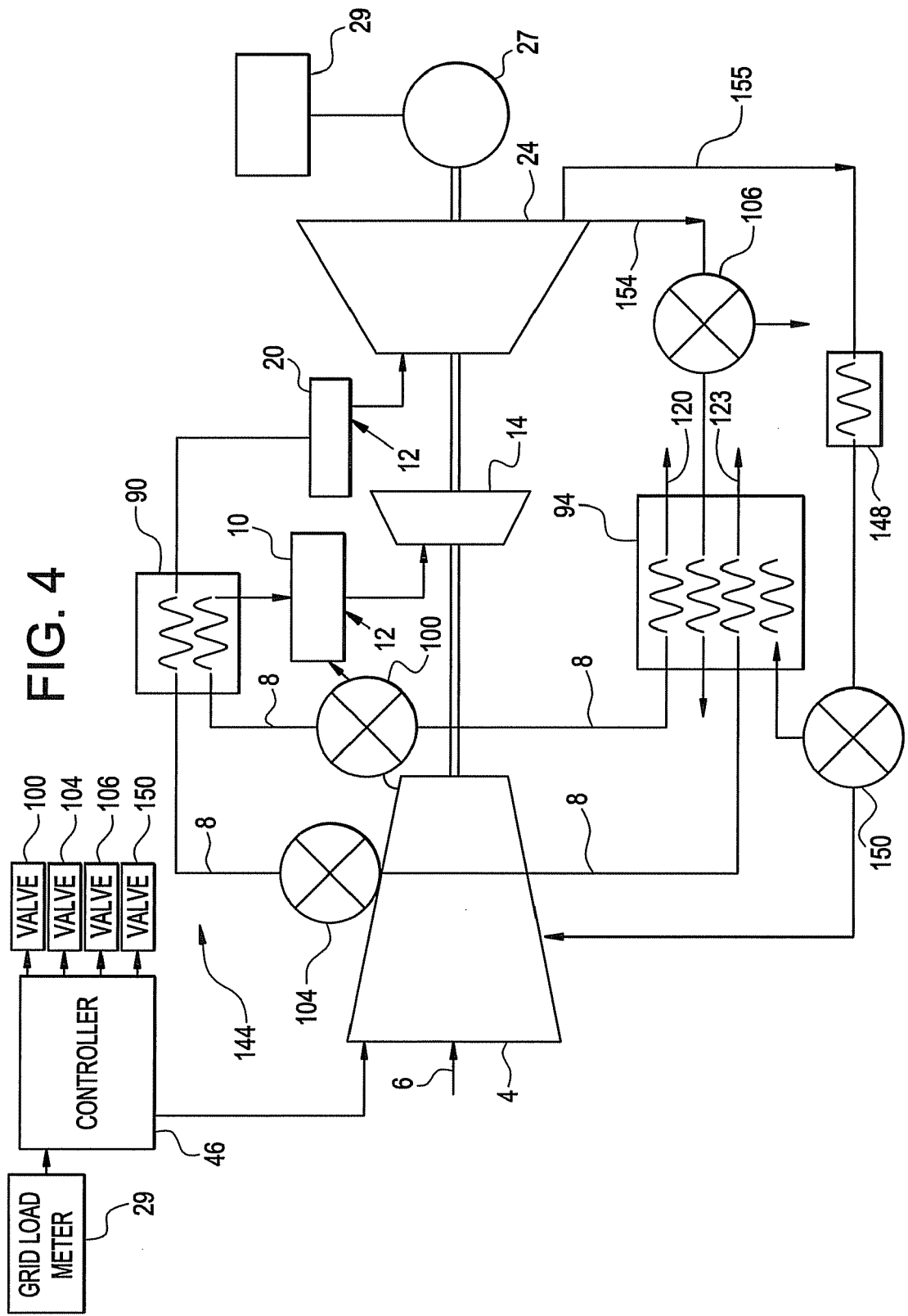
FIG. 4 is a schematic representation of a combined cycle power plant including a re-heat and exhaust gas regeneration system constructed in accordance with a fourth exemplary embodiment of the present invention.

Reference will now be made to FIG. 4, wherein like reference numbers represent corresponding parts in the several views, in describing a combined cycle power plant 144 constructed in accordance with a third exemplary embodiment of the present invention. As shown, power plant 144 includes an additional or third heat exchanger 148 coupled to a fourth valve 150. Valve 150 selectively delivers turbine component cooling air from second turbine 24 to compressor 4 when power plant 2 is operating in the first mode, and to heat exchanger 94 when power plant 2 is operating in the second mode. More specifically, when operating in the first mode, exhaust gases 154 from second turbine 24 pass through valve 106 and onto HRSG 44, while turbine component cooling air 155 is passed into third heat exchanger 148 to be cooled and pass out through valve 150 back to compressor 4. When operating in the second mode, exhaust gases 154 pass to second heat exchanger 94 for use in heating high pressure air streams 8 that are delivered to combustors 12 and 20. To further facilitate the heating of high pressure air streams 8, turbine component cooling air 155 is also passed into second heat exchanger 94. In this manner, when operating in the first mode, a turbine component cooling air 155 is diverted back to compressor 4 for reuse in combustion to provide added efficiencies. However, when operating in the second mode, exhaust gases and turbine component cooling air from second turbine 24 are used to preheat the high pressure compressor air stream in order to reduce emissions.

At this point it should be appreciated that when power plant 2 is operated at less than full or base load, insufficient heat is generated to burn off combustion by-products such as, nitrogen oxides. The exemplary embodiments of the present invention provide various systems for preheating the compressor air streams in order to achieve combustion efficiencies that result in a significant reduction in emissions when the power plant is operating at less than base load. It should also be appreciated that in addition to the components illustrated in the FIGS., the combined cycle power plant may include systems such as, economizers, re-heaters, super heaters and the like that are not shown for clarity of the drawings.

In general, this written description uses examples to disclose the invention, including the best mode, and also to enable any person skilled in the art to practice the invention, including malting and using any devices or systems and performing any incorporated methods. The patentable scope of the invention is defined by the claims, and may be includes other examples that occur to those skilled in the art. Such other examples are intended to be within the scope of the present invention if they have structural elements that do not differ from the literal language of the claims, or if they include equivalent structural elements with insubstantial differences from the literal language of the claims.

The invention claimed is:

1. A combined cycle power plant comprising:
   a compressor;
   a first turbine mechanically coupled to the compressor;
   a second turbine mechanically to the compressor, the second turbine outputting exhaust gases;
   a first combustor fluidly connected to the first turbine;
   a second combustor fluidly connected to the second turbine;
   a heat recovery steam generator fluidly connected to the second turbine;
   a heat exchanger fluidly connected to the compressor, the first combustor, the second combustor and the heat recovery generator; and
   a controller selectively operating the combined cycle power plant in a first mode based on a first power output of the combined cycle power plant wherein, compressor air is passed through the heat exchanger before being delivered to the first and second combustors and exhaust gas from the second turbine is passed to the heat exchanger, the exhaust gas from the second turbine pre-heating the compressor air passing through the heat exchanger to the first and second combustors, and in a second mode based on a second power output that is greater than the first power output of the combined cycle power plant, wherein air from the compressor is delivered directly to each of the first and second combustors and exhaust gas from the second turbine is delivered to the heat recovery steam generator, transitioning between the first and second modes is based on power output from the combined cycle power plant.

2. The combined cycle power plant according to claim 1, further comprising: a grid load meter, the controller automatically switching from the second mode to the first mode when utility demand measured by the grid load meter falls below a predetermined threshold.

3. The combined cycle power plant according to claim 1, wherein when operating in the first mode, the exhaust gas from the second turbine passing through the heat exchanger is delivered to the heat recovery steam generator.

4. The combined cycle power plant according to claim 1, wherein the heat exchanger comprises a first heat exchanger and a second heat exchanger, the first heat exchanger operating as a combustion air cooler and the second heat exchanger operating as a combustion air and fuel re-heater.

5. The combined cycle power plant according to claim 4, wherein when operating in the first mode the controller delivers the compressor air and the exhaust gas from the second turbine through the second heat exchanger before being passed to the first and second combustors, and when operating in the second mode the controller delivers the compressor air through the first heat exchanger prior to delivery to the first and second combustors and exhaust gas from the second turbine directly to the heat recovery steam generator.

6. The combined cycle power plant according to claim 5, wherein when operating in the first mode, exhaust gas from the second turbine passes into the second heat exchanger and into an exhaust system open to ambient air.

7. The combined cycle power plant according to claim 4, further comprising a third heat exchanger fluidly connected to the compressor, second turbine and second heat exchanger.

8. The combined cycle power plant according to claim 7, wherein compressor cooling air from one of the first and second turbines is passed through the third heat exchanger, through the second heat exchanger and to the first and second combustors when the combined cycle power plant is operated in the first mode and, when operated in the second mode, the compressor cooling air from the one of the first and second turbines is passed through the third heat exchanger and back to the compressor.

9. The combined cycle power plant according to claim 7, wherein when operating in the first mode, the controller directs exhaust gas from the second turbine through the second heat exchanger to pre-heat compressor air passing to the first and second combustors, and when operating in the second mode, the controller directs exhaust gas from the second turbine to the heat recovery steam generator.

10. The combined cycle power plant according to claim 1, wherein the first turbine is a high pressure turbine (HPT) and the second turbine is a low pressure turbine (LPT).

11. The combined cycle power plant according to claim 1, wherein when operating in the first mode, the combined cycle power plant is operating at part load output and when operating in the second mode, the combined cycle power plant is operating at base load.

12. A method of operating a combined cycle power plant including a compressor, a first turbine mechanically coupled to the compressor, a second turbine mechanically coupled to the first turbine, a first combustor fluidly connected to the first turbine, a second combustor fluidly connected to the second turbine, and a heat recovery steam generator, the method comprising:
   operating the turbine in a first mode based on a first power output from the combined cycle power plant including:
      passing the air from the compressor through a heat exchanger;
      delivering the exhaust gas from the second turbine through the heat exchanger;
      pre-heating the air from the compressor in the heat exchanger with the exhaust gases from the second turbine to form a pre-heated air stream; and
      guiding the pre-heated air stream from the heat exchanger to each of the first and second combustors; and
   operating the turbine in a second mode, based on a second power output of the combined cycle power plant that is greater than the first power output, including:
      guiding air from the compressor directly to the first and second combustors; and
      delivering exhaust gases from the second turbine to the heat recovery steam generator wherein switching between the first and second modes is based on power output from the combined cycle power plant.

13. The method according to claim 12, further comprising:
sensing a demand for a utilities provided by the combined cycle power plant; and
operating the combined cycle power plant in the first mode when the demand for the utilities falls below a predetermined level.

14. The method of claim 12, wherein when operating in the first mode, further comprising: delivering the exhaust gases passing through the heat exchanger to the heat recovery steam generator.

15. The method of claim 12, further comprising:
guiding the compressor air through another heat exchanger before being passed to the first and second combustors when the combined cycle power plant is operated in the first mode; and
delivering the compressor air through the heat exchanger prior to delivery to the first and second combustors when the combined cycle power plant is operated in the second mode.

16. The method of claim 15, further comprising: guiding the exhaust gas from the second turbine passing from the another heat exchanger into an exhaust system open to ambient air.

17. The method of claim 15, further comprising:
passing exhaust gas from the second turbine through the another heat exchanger to pre-heat compressor air passing to the first and second combustors when the combined cycle power plant is operated in the first mode; and
directing exhaust gas from the second turbine to the heat recovery steam generator when the combined cycle power plant is operated in the first mode.

18. The method of claim 16, further comprising:
passing compressor cooling air from one of the first and second turbines to a third heat exchanger, through the another heat exchanger and to the first and second combustor when the combined cycle power plant is operated in the first mode; and
passing compressor cooling air from one of the first and second turbine through the third heat exchanger and back to the compressor when the combined cycle power plant is operated in the second mode compressor.

* * * * *